Figure 1:
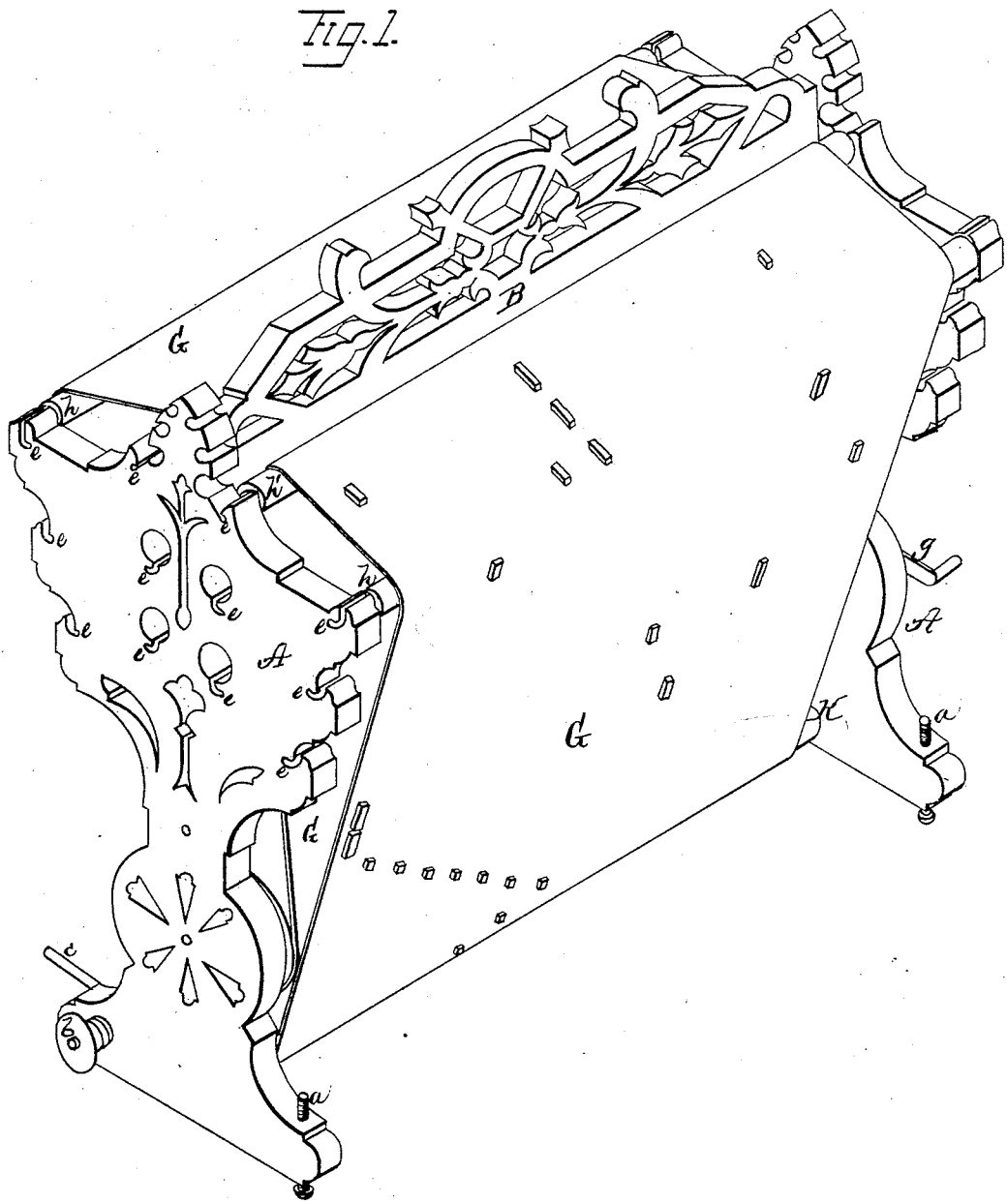

2 Sheets—Sheet 1.

J. E. JONES.
Key Board Attachment for Musical Instruments.

No. 231,723. Patented Aug. 31, 1880.

Witnesses:
W. C. McArthur,
John C. Rogers.

Inventor.
per John E. Jones
T. H. Alexander
Attorney.

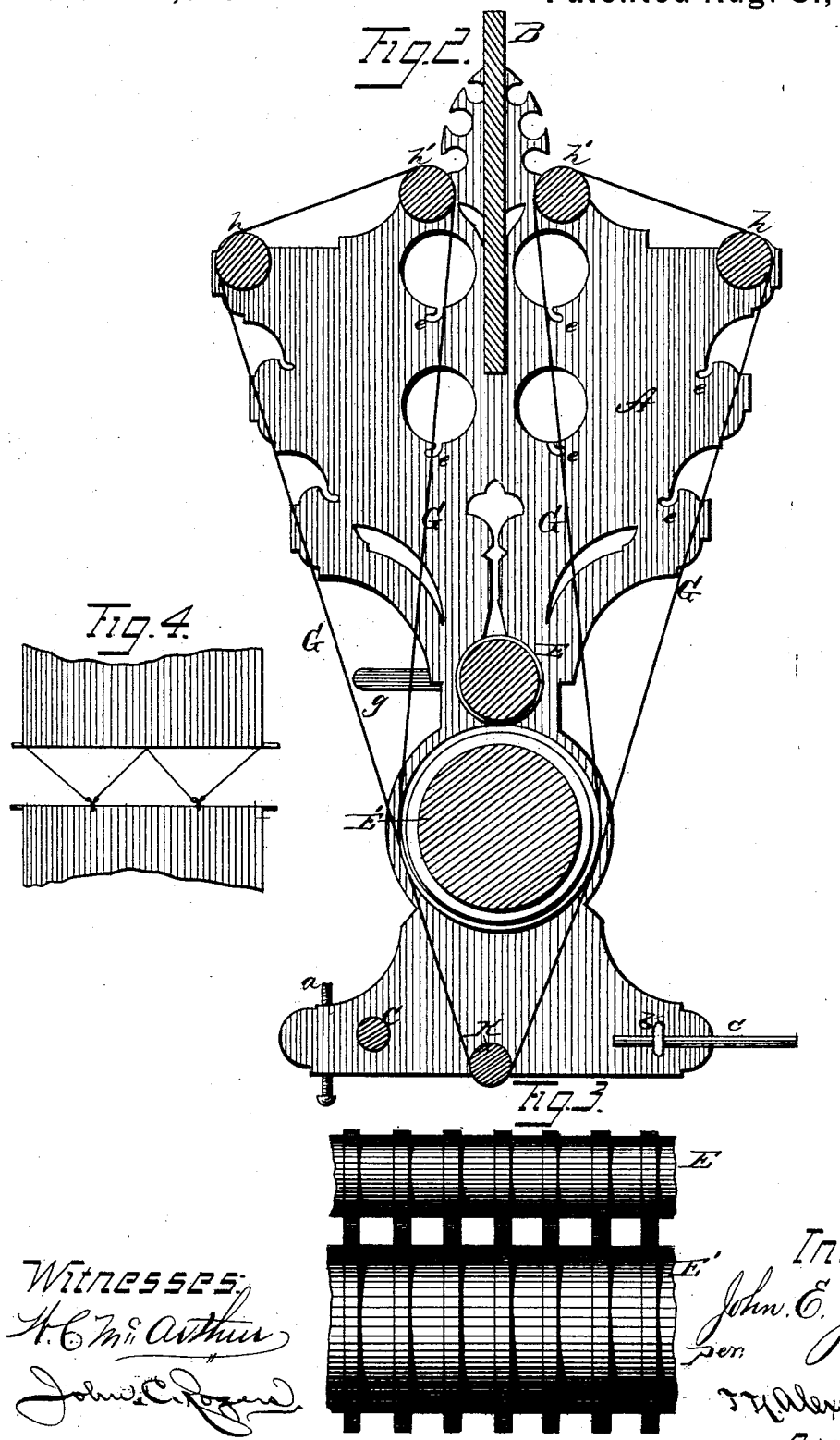

UNITED STATES PATENT OFFICE.

JOHN E. JONES, OF STORM LAKE, IOWA, ASSIGNOR TO A. L. STETSON, OF SAME PLACE.

KEY-BOARD ATTACHMENT FOR MUSICAL INSTRUMENTS.

SPECIFICATION forming part of Letters Patent No. 231,723, dated August 31, 1880.

Application filed February 13, 1880.

*To all whom it may concern:*

Be it known that I, JOHN E. JONES, of Storm Lake, in the county of Buena Vista and State of Iowa, have invented certain new and useful Improvements in Self-Playing Attachments for Key-Board Instruments; and I do hereby declare that the following is a full, clear, and exact description thereof, reference being had to the accompanying drawings, and to the letters of reference marked thereon, which form part of this specification, in which—

Figure 1 is a perspective view of my attachment; Fig. 2, a central vertical section through the same; and Figs. 3 and 4 are details of parts thereof.

The object I have in view is to simplify, cheapen, and render more easy of operation the attachment or machine for an automatic performance on a key-board instrument; and to this end my invention consists in certain details of construction, which will be hereinafter fully set forth, and specifically indicated in the claims.

To enable others skilled in the art to make and use the same, I will now describe its construction and operation.

A A represent the side pieces or standards, which are connected together at their top by an ornamental brace, B, and at their bottom by rod or brace C.

The configuration of standards A A, I designedly adopt, as a double purpose is subserved thereby. Thus, while a certain æsthetic effect is produced, I utilize some of the features which contribute to the ornamentation of the standards for bearings, (for the rollers which carry the chart,) as shown by the drawings at $e\ e$. These bearings, together with the entrances to them, form openings in L shape, so as to properly retain the journals of the rollers in their proper places as the chart revolves over and against them. It will also be observed that by constructing the standards in the form shown in the drawings I am enabled to locate these bearings in varying distances apart, which admit of an adjustment of the rollers to different lengths of charts.

$a\ a$ are adjusting-screws for the purpose of adapting the attachment vertically to any key-board, while the clamping-screws $b\ b$ and extension-rods $c\ c$ are intended to adjust it to key-boards of varying widths and heights.

E represents a friction-roller journaled at each end in the standards and provided with crank $g$. E' is a larger roller, of about double the diameter of the other, also journaled between the standards, and grooved radially at intervals of one-half inch, more or less, as desired. These rollers are provided with rubber bands, which come in close contact one upon the other, thus imparting the necessary friction by which the larger roller is operated.

$h\ h\ h'\ h'$ represent the top rollers, which are suitably journaled in the L-shaped spaces $e\ e$, according to the length of chart to be used. $k$ is the bottom roller, and should be about the same diameter as those at top.

G represents the chart, which has been previously provided with projections on its outer surface, to correspond to the notes in a given piece of music, and which are arranged on the chart to strike successively or in harmony the keys corresponding to said notes.

It is, of course, understood that the projections are to vary in length in proportion to the value of the note they represent.

The chart may be made of paper, cloth, or other suitable material, and its two ends connected by rubber cords, substantially in the manner shown in the drawings, thus keeping it tight against the rollers and insuring its revolution when the crank is turned.

The manner of arranging the chart is as follows: It is first passed down under roller $k$, then upward and over rollers $h\ h$ and $h'\ h'$, and then down under roller E', where the two ends are connected, as already described.

I would observe that my object in having the roller $k$ as small as it is, is to allow the quick passage of the notes over the keys, so that short notes will be clear and distinct, and prevent the running together of the music.

In operating my attachment I first properly adjust it to the key-board by means of the screws $a\ a$ and $b\ b$, with their rods $c\ c$, and then simply turn the crank, which revolves the chart and plays the tune arranged thereon.

I am fully aware that this means of playing a key-board instrument is not new, and do not claim, therefore, such as my invention; but What I do claim, and desire to secure by Letters Patent, is—

1. In an attachment for key-board instruments, the standards A A, provided with adjusting-screws $a\ a$, clamping-screws $b\ b$, and extension-rods $c\ c$, for the purpose of adjusting it to the key-board, substantially as herein described.

2. The combination, in an attachment for key-board instruments, of standards A A, rollers E, E', $h$, $h$, $h'$, $h'$, and $k$, with a revolving chart, all constructed and arranged to operate substantially as herein set forth.

In testimony that I claim the foregoing as my own I affix my signature in presence of two witnesses.

JOHN E. JONES.

Witnesses:
W. LEE VESTAL,
THOMAS A. JONES.